US009463125B2

(12) United States Patent
Panzer (10) Patent No.: US 9,463,125 B2
(45) Date of Patent: Oct. 11, 2016

(54) LIFTING COLUMN (71) Applicant: Hans Peter Panzer, Lörrach (DE)

(72) Inventor: Hans Peter Panzer, Lörrach (DE)

(73) Assignee: AKTIEBOLAGET SKF, Gothenburg (SE)

( * ) Notice: Subject to any disclaimer, the term of this patent is extended or adjusted under 35 U.S.C. 154(b) by 368 days.

(21) Appl. No.: 14/250,471

(22) Filed: Apr. 11, 2014

(65) Prior Publication Data
US 2015/0290058 A1   Oct. 15, 2015

(30) Foreign Application Priority Data

Apr. 11, 2013  (DE) .................. 10 2013 206 348

(51) Int. Cl.
A61G 7/012   (2006.01)
F16B 7/10    (2006.01)
A61G 13/06   (2006.01)
B66F 7/00    (2006.01)
(Continued)

(52) U.S. Cl.
CPC .............. A61G 7/012 (2013.01); A61G 3/062 (2013.01); A61G 3/063 (2013.01); A61G 5/104 (2013.01); A61G 5/1059 (2013.01); A61G 7/1019 (2013.01); A61G 13/0018 (2013.01); A61G 13/06 (2013.01); B66F 7/00 (2013.01); F16B 7/105 (2013.01); A61G 2203/76 (2013.01)

(58) Field of Classification Search
CPC ...... A61G 13/02; A61G 13/06; A61G 3/062; A61G 3/063; A61G 5/104; A61G 5/1059; A61G 7/1019; B66F 7/04; B66F 7/22; F16B 7/10; F16B 7/105; A47B 9/00; A47B 9/20; Y10T 403/7077; Y10T 403/7079; Y10T 403/32508; Y10T 403/32497; Y10T 403/32475
See application file for complete search history.

(56) References Cited

U.S. PATENT DOCUMENTS 5,385,323 A * 1/1995 Garelick .................. A47C 3/28
                                                    248/157
5,791,233 A   8/1998 Knapp
7,658,359 B2 * 2/2010 Jones ........................ A47B 9/00
                                                    108/147

(Continued)

FOREIGN PATENT DOCUMENTS

DE      3904510 A1 * 11/1989  ............... A47B 9/14
DE   196 23 580 C2   12/1997

(Continued)

OTHER PUBLICATIONS

Machine Translation of DE 3904510 A1, generated Jun. 8, 2016, http://worldwide.espacenet.com/.*

Primary Examiner — Daniel Wiley
(74) Attorney, Agent, or Firm — Bryan Peckjian; SKF USA Inc. Patent Dept.

(57) ABSTRACT

A lifting column includes first and second lifting column components, one slidably receivable in the other, each having mutually facing guide surfaces. The first lifting column component has first and second openings in its guide surface, and first and second guide components mounted in these openings. Each of the guide components includes an attachment structure that projects into one of the first and second openings and a substantially planar guide section connected to the attachment structure that overlies a guide surface of the first lifting component and that is configured to abut on the guide surface of the second lifting column component. The first and second guide components are configured such that they are in contact with each other when the attachment structures are mounted the openings.

16 Claims, 4 Drawing Sheets (51) Int. Cl.
*A61G 3/06* (2006.01)
*A61G 5/10* (2006.01)
*A61G 7/10* (2006.01)
*A61G 13/00* (2006.01)

(56) References Cited

U.S. PATENT DOCUMENTS

| | | | | |
|---|---|---|---|---|
| 8,291,840 B2 * | 10/2012 | Baracchia | ............... | A47B 9/00 108/147.19 |
| 8,430,218 B2 * | 4/2013 | Klinke | ................... | A47B 9/20 188/300 |
| 8,549,812 B1 * | 10/2013 | Peng | ................... | E04B 1/34305 212/348 |
| 8,636,436 B2 * | 1/2014 | Roither | ................... | F16B 7/10 403/107 |
| 2008/0099654 A1 * | 5/2008 | Bailly | ................... | B66C 23/707 248/644 |

FOREIGN PATENT DOCUMENTS

| | | |
|---|---|---|
| DE | 202012102704 U1 | 10/2013 |
| EP | 2372172 A1 | 10/2011 |
| JP | H0514083 U | 2/1993 |

* cited by examiner

LIFTING COLUMN

CROSS-REFERENCE TO RELATED APPLICATIONS

This application claims priority to German patent application no. 102013206348.2 filed on Apr. 11, 2013, the contents of which are fully incorporated herein by reference.

TECHNOLOGICAL FIELD

Exemplary embodiments are directed to a lifting column that is usable, for example, in various types of medical equipment, including without limitation, wheelchairs and examination tables, and that also has various industrial applications.

BACKGROUND

Lifting columns, which are sometimes referred to as telescopic columns or telescopic actuators, are used in a wide variety of technical fields. They have medical applications, for example, in examination tables and wheelchairs, and in other devices where lifting movement may occur. They are also used outside the medical field, for example, to facilitate the movement of machine parts or other components along a direction of movement.

Lifting columns thus generally comprise at least two tubular or columnar components that are insertable one-into-another along a direction of movement and are thus movable telescopically with respect to each other. Guide elements are often provided to guide the components in order to improve mechanical stability. The guide elements effect a linear supporting of the two components with respect to each other.

The lifting columns are sometimes subject to eccentric loads in addition to the linear shear forces for which they are designed. These loads may occur when the geometric relationship of the components deforms, as a result of frictional forces, for example, but also for other reasons. Some lifting columns are very sensitive to such torques, and these torques may adversely affect the operation of the lifting column. This behavior is particularly noticeable in structurally simple guide elements.

DE 196 23 580 C2 and its US family member U.S. Pat. No. 5,791,233 describe a lifting column which can be used for medical applications, such as in examination tables, or for industrial applications. The lifting columns described in these patents use guide elements which make possible a guiding of corresponding tubular profiles of the lifting columns. These guide elements are multipart, and the individual parts of the guide elements are comprised of different materials.

There is therefore a need to provide a structurally simple arrangement of telescopic lifting column components with guide elements that have an improved ability to withstands torques caused by eccentric loads on the components.

SUMMARY

This problem and others are addressed by embodiments of the present disclosure, a first aspect of which comprises a lifting column comprising first and second lifting column components that are formed so that they are insertable one-into-the-other along a direction of movement, in other words, telescopically. Each component has a guide surface extending along the direction of movement, and the guide surfaces face each other in a retracted state of the lifting column, that is, when one of the components is inside the other. The first lifting column component has a first and a second opening in the guide surface. The lifting column further includes a first and a second guide component which each have an attachment structure and a substantially planar guide section. The guide components are formed such that the attachment structures are insertable into the openings of the first lifting column component so that they abut on the guide surfaces of the second lifting column component. The guide components and the openings are formed and disposed such that the guide components are in contact with each other when the attachment structures are inserted into the openings.

With such a construction, a suitable linear guiding of the lifting column components can be realized which construction makes possible an improved absorption of torques that occur when a load is applied. This is accomplished by providing two guide components in the lifting column that support each other when moments of force and/or torques arise. To accommodate the two guide components, two openings are provided in the guide surface of the first lifting column component. In this way the second guide component can be introduced into the second opening via its attachment structure and be mechanically connected to the first lifting column component. Since both guide components are mechanically connected to the first lifting column component, a torque acting on one of the guide components is transferred to the other guide component via the contact therebetween. In this way a torque that would have acted on a single guide component in the prior art is now distributed between two guide components that are in contact with each other.

Such a configuration also reduces the risk of shearing off the attachment structure from the guide section of one of the guide components because torques are distributed between the attachment structures of the two guide sections. Such a shearing off sometimes previously occurred when there was no corresponding torque, or possibly only a significantly lesser magnitude torque, opposing a torque acting on one of the two guide components. The present disclosure distributes torques to the two attachment structures under various operating conditions. The distribution of the torques can depend on the specific operating situations and operating conditions to which the lifting column is subjected, and this distribution of torques is rarely identical or perfectly symmetrical.

The first and/or the second lifting column component can be formed as a hollow profile and may have a cross-section perpendicular to its direction of movement that is non-circular. The cross section may be for example, polygonal, e.g., without limitation, square or rectangular or hexagonal or octagonal. It may also comprise another non-circular cross-section that includes both linear and curved portions.

In a lifting column according to an exemplary embodiment the guide components are formed so that they contact each other along a line segment. That is, each of the guide components has a linear surface, and these two linear surfaces are in contact with each other. The guide components thus have a linear contact with each other, and this makes it is possible to distribute significant forces or torques between the two guide components. In this way a further improvement in the absorbing of torques can be achieved.

The line segment formed by the junction of the linear surfaces may extend substantially perpendicular to the direction of movement but parallel to the planes of the guide surfaces. In this way an additional loading of the attachment structures due to forces or torques oblique to the direction of movement can be reduced.

In a lifting column according to an exemplary embodiment, the first and the second lifting column components can be designed such that the guide sections of the guide components don't contact (or at least don't form an interference-fit with) the first and/or the second lifting column component in a direction parallel to the guide surfaces. In other words, the first and the second lifting column components can be designed such that the guide sections of the guide components are not in contact with the first and/or the second lifting column component, i.e. are contact-free, with respect to all directions parallel to the guide surfaces of the two lifting column components. However, perpendicular to the guide surfaces, they are in contact at least with the second lifting component in order to effect the guiding. The edges of the guide surfaces may also abut on the second lifting column, i.e. perpendicular to the guide surface, in some configurations.

With such a construction, the additional support provided by the second guide components can be advantageous because the guide components are not supported by the lifting column components. In this case forces or torques are induced in the guide components via the guide sections. In such a case an expensive or time-consuming matching or fitting of the lifting column components can be avoided, thus simplifying the construction of a lifting column.

The first and/or the second opening can be formed by a bore, a hole, a blind hole, or other recess which completely or at least partially penetrates a wall of the lifting column component. However, it can also optionally be embodied such that there is simply a reduction of a material thickness of the wall in the region of the openings.

In a lifting column according to an exemplary embodiment, the guide surfaces of the first and second lifting column components can be planar, that is, designed in the shape of a planar section, and the guide sections can be substantially plate-shaped. As used herein, a component designed as "plate-shaped" is understood to mean a component which is bounded along a certain direction by two flat sections which are: (i) offset parallel to each other, (ii) planar, and (iii) oriented substantially perpendicular to the aforementioned direction. The precise form of the planar sections perpendicular to the aforementioned direction is irrelevant here. These sections can be, for example, round or polygonal, or may have another shape.

The use of lifting column components having plate-shaped guide surfaces is sometimes necessary or advisable due to operation-related or construction-related constraints, and this may lead to the introduction of high torques in the guide components. In such a case, the use of a lifting column according to an exemplary embodiment can improve the absorption of any torques which may arise.

In such a lifting column, the guide sections of the guide components may extend at most 80% along a width of the guide surface of the first lifting column component along a circumferential or peripheral direction of the first lifting column component, which circumferential or peripheral direction is perpendicular to the direction of movement. The use of guide sections having a relatively small surface area, especially guide sections that do not extend over the entire width of a guide surface, can intensify the torques to which the guide components are subjected. Thus constructive constraints or operating conditions of the lifting column can be better taken into account without significantly degrading the mechanical stability and operational safety or reliability of the lifting column due to a failure of the guide components. In addition, in some cases it may be possible to use identical guide components for different series of lifting columns, different models of lifting columns, or at different locations of a single lifting column because the size and shape of the guide components need not correspond exactly that of another structure in the lifting column. That is, a guide component that extends over about 80% of the width of a first guide section may also be used on a wider guide section on which that guide component would only extend over about 70% of the width.

The attachment structure may be mounted so that it is offset with respect to a geometric center point of the guide section. Such an eccentric mounting of the attachment structure with respect to the guide section may increase the torques to which the guide components are subjected, and it may not always be possible to reconfigure the guide component to adequately resist such torques. Construction-related constraints and other constraints can all play a prominent role here. As a result, the manufacturing of a lifting column according to the present disclosure may be simplified.

The attachment structures of the guide components and the openings of the first lifting column component can be configured so that the attachment structures cannot rotate in the openings when the guide components are mounted in the openings. Forces applied to the guide components, torques applied to the guide surfaces, for example, may therefore stress the attachment structures. On the other hand, the implementation of a relative-rotation-preventing connection between the guide component and the first lifting column component may sometimes be required or advisable. That is, in such a situation the use of a lifting column according to an exemplary embodiment, which is configured to withstand such stresses, can be advantageous.

The attachment structures of the first and/or the second guide component, and/or the first and/or the second openings may not be completely rotationally symmetric. Alternately, the component can have an n-fold rotational symmetry, wherein n is a natural number greater than or equal to 2. An n-fold rotational symmetry exists if the component in question can be rotated about an axis of rotation or symmetry by $(360°/n)$ and still look the same, i.e. during a corresponding rotation it is substantially mapped onto itself in the mathematical sense. In contrast, with a completely rotationally symmetric embodiment of a component, with any turn of any angular extent about the axis of rotation or symmetry, the shape of the component remains the same, i.e. is substantially mapped onto itself in the mathematical sense. The attachment structures as well as the openings can also be embodied asymmetric.

The guide components can be aligned or at least partially aligned along the direction of movement, that is, mounted so they are at least partially one-behind-another in the direction of movement. In other words, the guide components can be disposed along the direction of movement and offset relative to one another such that the guide components are in contact with one another along the direction of movement. Since the lifting column components are insertable or slidable one-into-the-other only along the direction of movement, this arrangement of the guide components can optionally be implemented without additional installation space. It can thus optionally be implemented as a compact solution.

In a lifting column according to an exemplary embodiment, the guide components can be manufactured from a polymer, for example an injection-moldable polymer. Alternatively or additionally, the guide components can be unitary and have a one-piece construction. In an exemplary embodiment the guide components may thus be manufactured using an economical method so that the lifting column can be implemented using constructively simple means. Polyoxymethylene (POM) is an example of a suitable injection-moldable polymer. However, other polymers, such as polytetrafluoroethylene (PTFE), can also be used. The guide components may be one-piece or unitary regardless of the method by which they are formed. Here a "one-piece component" is understood to mean a component which is manufactured from one continuous piece of material. The term "one-piece" can therefore be synonymously used with the terms "integral" or "one-part" or "unitary."

In a lifting column according to an exemplary embodiment, the first and the second guide components may be identical. In other words, in an exemplary embodiment of a lifting column, the guide components can be identically manufactured components of the same type. In this way it is also possible to reduce the number of different parts for manufacturing a lifting column and thus further simplify a construction of such a lifting column.

Moreover, in a lifting column according to an exemplary embodiment, the first guide component and/or the second guide component can be formed to have or function as a lubricant reservoir. For this purpose, the guide sections of the first and/or the second guide components can have lubricant pockets facing towards the guide surface of the second lifting column component, which lubricant pockets are formed to be filled or fillable with a lubricant, for example a grease. Instead of or in addition to a grease, another appropriately viscous material having appropriate lubrication properties can be used as lubricant. The terms "lubricant" and "lubricating means" can be used synonymously.

In a lifting column according to an exemplary embodiment, the first lifting column component and the first and/or the second guide component are formed such that they form a plug-in or push-in connection. In this way a mounting of the guide components on the first lifting column component can be simplified.

Of course, the second lifting column component can also have a first and optionally a second opening in its guide surface, which are likewise formed such that a third and optionally a fourth guide component can correspondingly be inserted therein, as described above. The guide sections of the third and optionally fourth guide components can then face towards the guide surface of the first lifting column component and abut thereon in the assembled state. If both the third and the fourth guide components are provided, they can be mounted so that they are also in contact with each other when their attachment structures are introduced into the first and second opening of the second lifting column component.

The first and second openings in the guide surface of the first lifting column component, and the first and second openings in the guide surface of the second lifting column component may be mounted on sides of the respective lifting column components that face away from each other. In this way an appropriate guiding of the two lifting column components with respect to one another can be realized, potentially independently of an insertion state of the two lifting column components with respect to each other.

As used herein, a "friction-fit" connection results from static friction, a "materially-bonded" connection results from molecular or atomic interactions and forces, and an "interference-fit" connection results from a geometric connection of the respective connecting components. The static friction in particular presupposes a normal force component between the two connection partners.

According to an embodiment of the disclosure a lifting column comprising a first lifting column component having a length and including an exterior surface having at least one guiding surface and first and second longitudinally spaced openings in the guiding surface and a second lifting column component having a length and including an interior surface having at least one guiding surface and first and second longitudinally spaced openings in the guiding surface of the second lifting column. The first lifting column component is slidably mounted in the second lifting column component for telescopic movement in a direction of movement with the at least one guiding surface of the first lifting column component facing the at least one guiding surface of the second lifting column component. The lifting column further includes a first guide component and a second guide component, each of the first and second guide components having a plate-shaped guide section having a front wall, a rear wall and at least one side edge and an attachment structure projecting from the rear wall of the guide section. The attachment structure of the first guide component is mounted in the first opening in the at least one guiding surface of the first lifting column component, and the attachment structure of the second guide component is mounted in the second opening in the at least one guiding surface of the first lifting column component such that the at least one side edge of the first guide component contacts the at least one side edge of the second guide component.

BRIEF DESCRIPTION OF THE DRAWINGS

Exemplary embodiments are described and explained in more detail below with reference to the accompanying Figures.

DETAILED DESCRIPTION

In the following description of the accompanying figures, which show embodiments of the present invention, identical reference numerals indicate identical or comparable components. Furthermore, summarizing reference numerals may be used for components and objects that appear multiple times in an exemplary embodiment or in an illustration but that are described together in terms of one or more common features. Components or objects that are described with the same or summarizing reference numerals can be embodied identically, but also optionally differently, in terms of individual, multiple, or all features, their dimensions, for example, as long as the description does not explicitly or implicitly indicate otherwise.

Figures 1, 2:
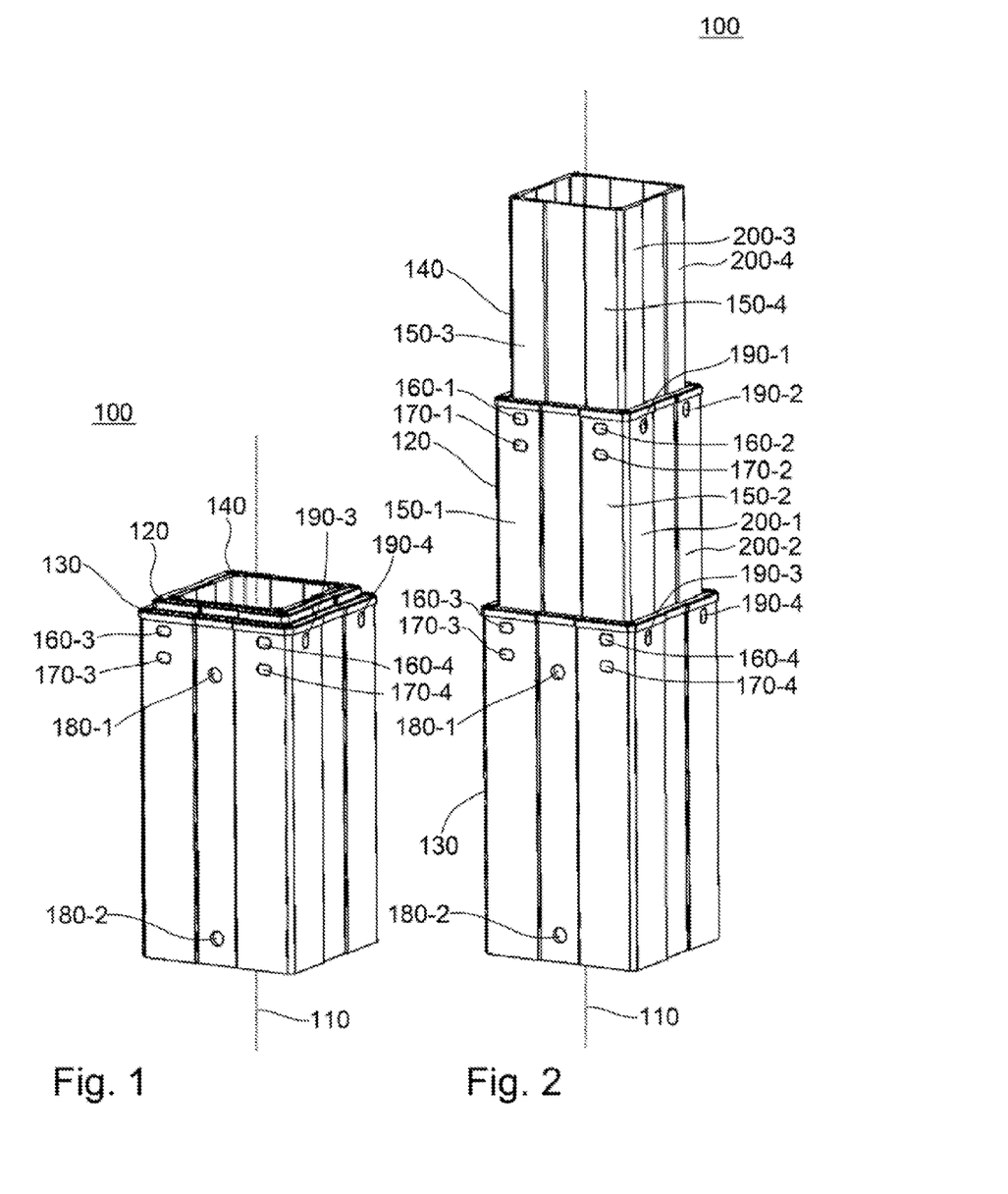
FIG. 1 is a perspective view of a lifting column according to an exemplary embodiment that includes first, second and third lifting column components in a retracted or brought-together state.
FIG. 2 is a perspective view of the lifting column of FIG. 1 with the lifting column components in an extended or pushed-apart state.

FIG. 1 shows a lifting column 100 according to an exemplary embodiment in a retracted state. FIG. 2 shows the lifting column 100 in a not-retracted or not-brought-together state, in other words, in an extended or partially extended state.

The lifting column 100 has three lifting column components 100 which are insertable one-into-the-other along a direction of movement 110. The direction of movement 110 is illustrated in FIGS. 1 and 2 as a dotted line and extends substantially parallel to a longitudinal direction of extension of the three lifting column components.

The lifting column 100 comprises a first lifting column component 120 which is the center lifting column component of the three lifting column components of the lifting column 100. The lifting column 100 has a second lifting column component 130 outside the first lifting column component 120 and a third lifting column component 140 inside the first lifting column component 120. The lifting column components 120, 130, 140 are formed as lifting column profiles or tube profiles which engage one-inside-the-other telescopically. They each have a cross-section perpendicular to the direction of movement 110 which deviates or differs from circular, and which in the present case is substantially square. More specifically, the lifting column components 120, 130, 140 are configured such that a cross-sectional plane perpendicular to the direction of movement 110 is substantially polygonal. As is illustrated in more detail in particular in the context of FIGS. 3 to 5, the profiles have different wall thicknesses, that is, the walls of each of the column components 120, 130, 140 vary in thickness around their peripheries.

Figure 6:
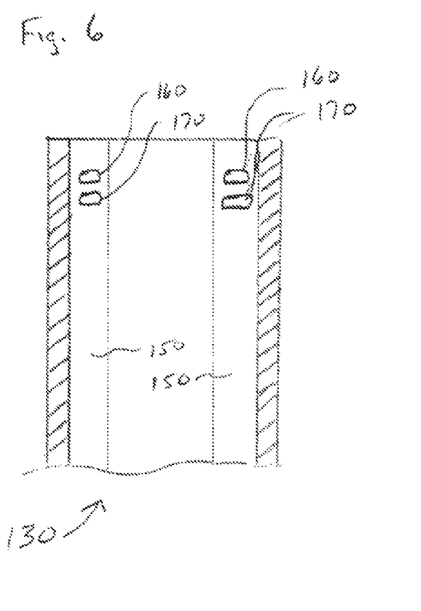
FIG. 6 is an elevational view, partly in section, of an inside wall of the second lifting column component of FIG. 1.

The first lifting column component 120 includes a plurality of guide surfaces 150-1, 150-2. Likewise the second lifting column component 130 has corresponding guide surfaces 150 inside the second lifting column component 130 that face the guide surfaces 150-1, 150-2 of the first lifting column component 120 when the first lifting column component 120 is inside the second lifting column component 130. The guide surfaces 150 of the second lifting column component 130 are illustrated in FIG. 6. Thus in a retracted or brought-together state, as shown in FIG. 1, the guide surfaces 150 of the second lifting column component face or oppose the guide surfaces 150-1 and 150-2 of the first lifting column component 120.

Figure 7:
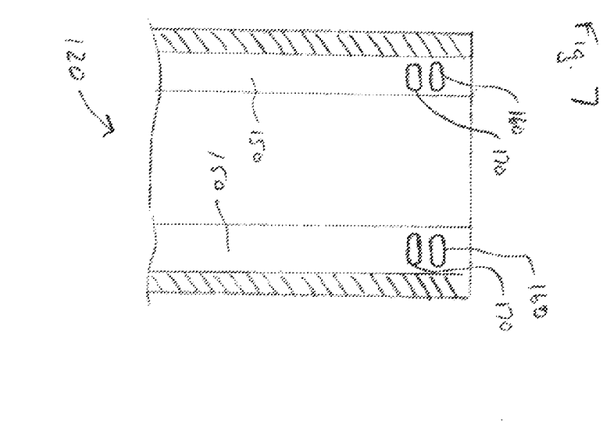
FIG. 7 is an elevational view, partly in section, of an inside wall of the first lifting column component of FIG. 1

Likewise the third lifting column component 140 has two guide surfaces 150-3 and 150-4 which in the retracted state oppose respective further guide surfaces 150 of the first lifting column component 120, illustrated in FIG. 7, which are inside the first lifting column component 120. However these guide surfaces 150 are not visible in FIGS. 1 and 2 because they are inside the first lifting column component 120.

The guide surfaces of the first, second and third lifting column components 120, 130, 140 extend here along the direction of movement 110 substantially entirely over the height of the respective lifting column components 120, 130, 140. In other exemplary embodiments of a lifting column 100 these guide surfaces 150 can of course also be embodied with a lesser height.

At least one first opening 160 and at least one second opening 170 are respectively implemented in the guide surfaces 150 of the first and second lifting column components 120, 130, as illustrated in FIGS. 6 and 7. Thus the first lifting column component 120 has two first openings 160 and two second openings 170 in the guide surfaces 150 that face towards the third lifting column component 140 and its guide surfaces 150-3, 150-4. The two first openings 160 are disposed along the direction of movement 110 closer to an outer end of the respective lifting column component 120 compared to the respective second openings 170. Independent thereof, however, two first and second openings 160, 170 are respectively disposed along the direction of movement 110.

Moreover, two further first openings 160-3, 160-4 as well as a further two second openings 170-3, 170-4 are illustrated in FIGS. 1 and 2. They are provided and disposed in the guide surfaces of the second lifting column component 130, shown in FIG. 6. The respective first openings 160 here are also disposed along the direction of movement 110 on an end closer, with respect to the second openings 170, to the respective end of the lifting column component.

Here the first and second openings 160, 170 have a substantially rectangular cross-section, and completely penetrate through the material of the respective lifting column components 120, 130, 140. The corners of the substantially rectangular holes are rounded. As a result, as will be explained in more detail in particular in the context of FIGS. 3 to 5, a torque can form due to the lack of complete rotational symmetry, and this torque can be transmitted to the respective lifting column component 120, 130, 140.

Of course in other exemplary embodiments, other forms or shapes of openings 160, 170 can be provided, and instead of an opening that penetrates through the respective lifting column component, a recess may be provided that does not extend through the lifting column component. Likewise the first and second openings 160, 170 can also be embodied, for example, as blind holes, for example as threaded blind holes.

The design of the openings 160, 170 as substantially rectangular holes having rounded edges makes possible, as will be shown below, the use of guide components that are connectable to the corresponding lifting column components 120, 130, 140 via a plug-in or push-in connection. This makes possible a fast and uncomplicated assembly of the respective guide components. In the exemplary embodiment of a lifting column 100 shown herein, the first and second openings 160, 170 are substantially identical.

Moreover, the second lifting column component has two further bores 180-1, 180-2, via which the second lifting column component 130 may be, for example, mechanically connectable to another component.

Moreover, the lifting column 100 likewise has further openings 190 which are disposed along a circumferential or peripheral direction of the respective lifting column components 120, 130, 140 substantially at the height of the first openings 160. Thus the first lifting column component has two further openings 190-1 and 190-2 illustrated in FIG. 2, while the second lifting column component 130 has two further openings 190-3, 190-4 illustrated in FIGS. 1 and 2. The further openings 190 are disposed in further guide surfaces 200 inside the first lifting column component 120 which are likewise not visible in FIGS. 1 and 2. However, the corresponding further guide surfaces which oppose the not-shown further guide surfaces 200 are illustrated, as is also the case in the context of the guide surfaces 150. Thus the first lifting column 120 has two further guide surfaces 200-1, 200-2 which oppose the further openings 190-3, 190-4 in the retracted state illustrated in FIG. 1 of the lifting column 100. The third lifting column 140 correspondingly also has two further guide surfaces 200-3, 200-4 which are correspondingly disposed with regard to the further openings 190-1, 190-2.

The further openings 190 can be substantially identical to the first or second openings 160, 170; however they can also be different therefrom. Thus in the exemplary embodiment shown in FIGS. 1 and 2 of a lifting column 100, the further openings 190 are identical to the first and second openings 160, 170 with respect to their geometric form, but are rotated by 90°.

Figure 3:
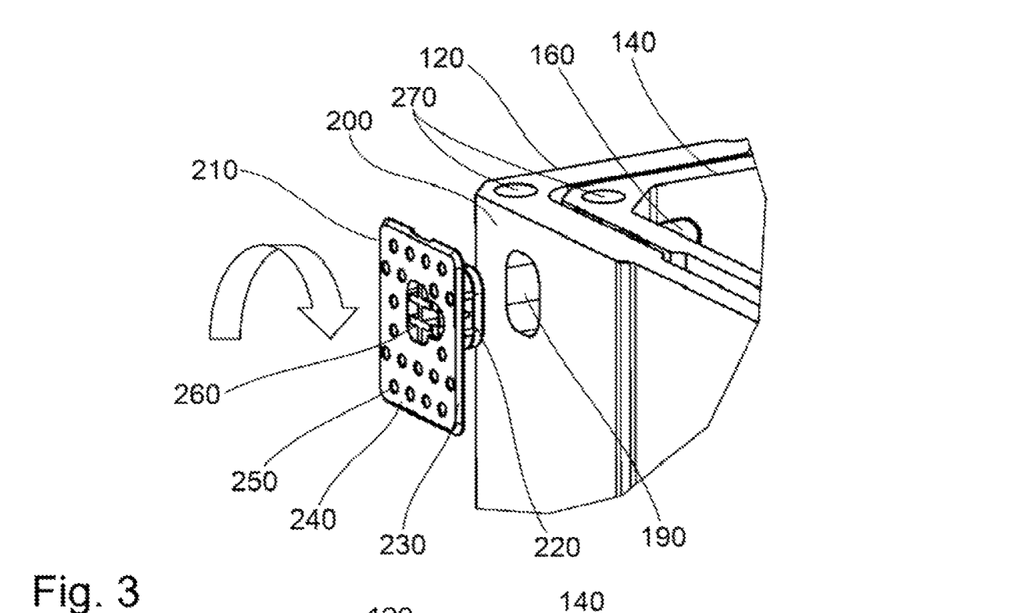
FIG. 3 is a partial, exploded, perspective view of part of the lifting column of FIG. 1 showing a region of the first lifting column component that has a single opening and a single guide component.

FIG. 3 shows a partial exploded view of the first and the third lifting column component 120, 140, wherein the region shown in FIG. 3 is covered by the second lifting column component 130 in FIGS. 1 and 2. The illustration of FIG. 3 is thus rotated by 180° with respect to that in FIGS. 1 and 2. Accordingly FIG. 4 shows a perspective view of the section shown in FIG. 3.

Figure 4:
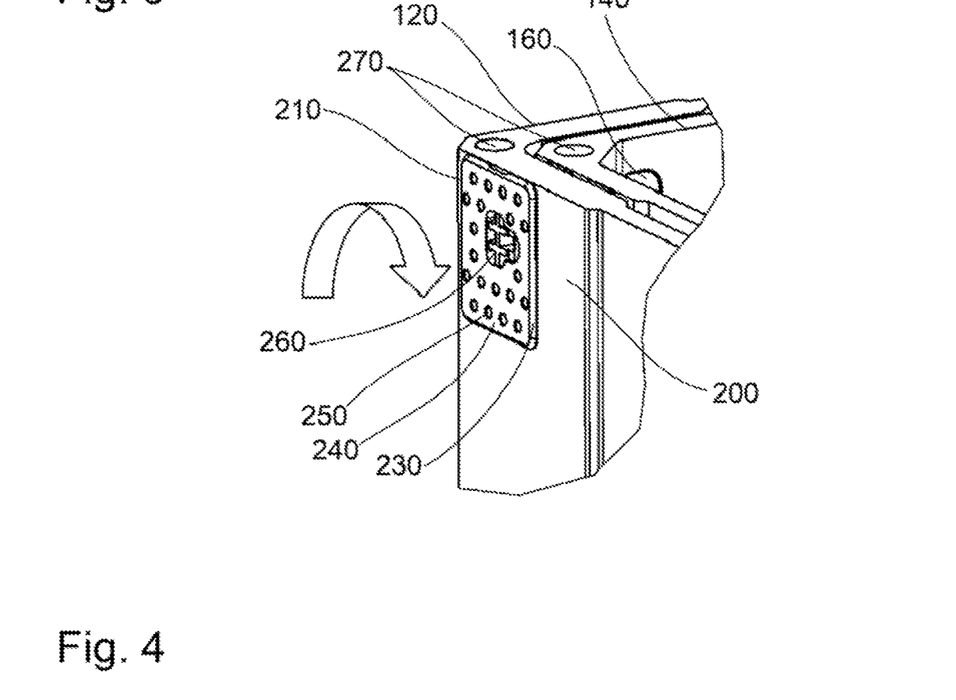
FIG. 4 is a perspective view of the region of FIG. 3 with the guide component mounted in the opening.

FIGS. 3 and 4 thus show a further opening 190 in a further guide surface 200 of the first lifting column component 120. As was already explained above, the further opening 190 is substantially rectangular, but its corners are rounded. In particular, the further opening 190 has a shape which is not completely rotationally symmetric, and thus a torque can be transmitted to the first lifting column component 120 via the further opening 190. However, the further opening 190 has a 2-fold symmetry, so that after turning the further opening 190 by 180° (=360°/2) this opening once again maps onto itself in the mathematical sense.

In addition, FIG. 3 shows a guide component 210 before insertion into the further opening 190, which guide component 210 has an attachment structure 220 and a guide section 230. The attachment structure 220 is formed so that it can be inserted into the further opening 190 and—due to the identical embodiment of the further openings 190, the first openings 160, and the second openings 170—also into the first and second openings 160, 170. In this way the guide component 210 can be mechanically connected to the respective lifting column component in a rotationally fixed manner, i.e. in the present case to the first lifting column component 120. Here the attachment structure 220 provides an interference-fit connection of the guide component 210 and of the first lifting column 120 with respect to rotations around the further opening 190.

The attachment structure 220 and the further opening 190 or the corresponding first and second openings 160, 170 form here a plug-in or push-in connection which makes possible a fast and simple assembly of the guide components 210. In this way the guide components 210 can also be attached to the corresponding lifting column components 120, 130, 140.

The guide component 210 further has the guide section 230 already mentioned above, which is planar. More specifically the guide section 230 is a section of the guide component 210 that is substantially plate-shaped and that is bounded by two substantially planar and parallel front and rear surfaces. The front surface forms a sliding surface 240 with which the guide section 230 of the guide component 210 is in contact with a corresponding guide surface, for example the further guide surface 200 of the second lifting column component not shown in FIGS. 3 and 4. Here the sliding surface 240 has a plurality of recesses, which act as lubricant pockets, and are formed such that they are fillable or filled with a lubricating means or a lubricant. If the lubricant pockets 250 are thus filled with a lubricant, for example a grease, a lifetime lubrication (for-life lubrication) of the linear guiding can thus be realized, which linear guiding is formed by the guide component 210 and the corresponding guide surface 200. Of course in other exemplary embodiments the lifting column 100 can be re-lubricated, during maintenance, for example.

The attachment structure 220 is connected to the guide section 230 of the guide component 210 via a substantially crosspiece-shaped or bridge-shaped connecting structure 260. If forces are applied to the guide section 230 in a direction parallel to the sliding surface 240, they are transmitted via the connecting structure 260 and the attachment structure 220 and the further opening 190 or the corresponding first and second openings 160, 170 to the respective lifting column component (here the first lifting column component 120). The crosspiece design of the connecting structure 260 can be advantageous in terms of manufacture, since in this way an improved mechanical stability can be achieved, while the guide component 210 is nonetheless manufacturable by an injection-molding method.

The guide component 210 is implemented as a one-piece guide component and is manufactured from an injection-moldable polymer. This enables a linear guiding of the material of the guide surface 150 on the one hand or the further guide surfaces 200 on the other hand, without causing excessive frictional resistance. In addition, the material in question should be selected to have a sufficient mechanical stability.

Thus the guide component 210 can, for example, be manufactured from polyoxymethylene (POM) or a comparable thermoplastic using an injection-molding process. Polytetrafluoroethylene (PTFE) can also optionally be used. However, polytetrafluoroethylene is suitable for injection molding only to a limited extent, and thus another manufacturing method, for example a machining (cutting) method, should be used in such a case for the guide component 210.

Furthermore, FIGS. 3 and 4 likewise show a first opening 160 of the third lifting column component 140 as well as two bores 270 for mounting further components on the lifting column 100 according to an exemplary embodiment.

Because the attachment structure 220 protrudes beyond the guide section 230, the guide components 210 may also be referred to as "mushroom pegs." With high loads, as can occur in the case of eccentric loads on the lifting column components 120, 130, 140, the guide components 210 may be exposed to a torque due to unevenly occurring frictional forces, as is indicated by the arrows in FIGS. 3 and 4. Corresponding torques and eccentric loads related thereto can occur with concave or convex profile tubes if these are sectionally or completely used as lifting column components 120, 130, 140. While the connecting structures 260 can generally transmit linear shear forces well to the corresponding openings 160, 170, 190, the occurrence of a torque, even with small loads, can destroy or damage the guide component 210 such that the attachment structure 220 is twisted off or sheared off from the guide section 230. In other words, the mushroom pegs can be destroyed by excessive torque, and the corresponding destruction may occur in the form of a shear failure or shear breakage of the attachment structure 220 on the mushroom peg 210. The attachment structure 220 may also be referred to as an attachment pin. This generally leads to loss of function of the respective guide component. The linear guiding of the lifting column components with respect to each other can thus break down.

Such destruction can occur if the guide section 230 is not connected to the respective lifting column component 120 by an interference fit in a direction parallel to the guide surface 200. As FIG. 4 in particular also shows, the guide section 230 abuts flat on the guide surface 200 and there is no interference fit between the guide section 230 and the guide surface 200. An interference-fit connection of the guide component 210 to the lifting column component 120, which prevents relative rotation, is realized here only via the attachment structure 220. Therefore, substantially all torque applied to the guide section 230 is applied to the attachment structure 220 which cannot rotate in its mounting opening.

As a further complication, the attachment structure 220 may be attached off center or eccentrically with respect to the guide section 230. This may be necessary or advisable for constructive or other reasons. In the present case the attachment structure 220 or the connecting structure 260 is attached to the guide section 230 off center, that is, in a not-completely-centered manner.

The form or shape of the guide illustrated in FIGS. 3 and 4 enables a linear guiding, using constructively simple means, of an appropriate lifting column 100. However, this linear guiding arrangement is not always entirely suitable for absorbing torques for the reasons discussed above. This form of guiding represented in FIGS. 3 and 4 using individual mushroom pegs (guide components 210) thus represents a conventional solution, as has been used to date in lifting column profiles. This form of guiding can additionally also be implemented in the context of a lifting column 100 according to an exemplary embodiment, as has been explained in connection with FIGS. 1 to 4.

However, an exemplary embodiment of a lifting column 100 has a first and a second opening 160, 170 which for example—as shown in FIGS. 1 and 2—can be offset relative to one another along a direction of movement 110 in a corresponding guide surface 150. Two guide components 210 are inserted into the first and second openings 160, 170. The openings 160, 170, and the corresponding guide components 210 are formed or disposed such that in the assembled state the guide components are in contact with each other. Exemplary embodiments of a lifting column 100 can thus be based on the use of double sliders or double mushroom pegs for guiding of telescopic lifting column profiles, as is shown for example in FIG. 5.

Figure 5:
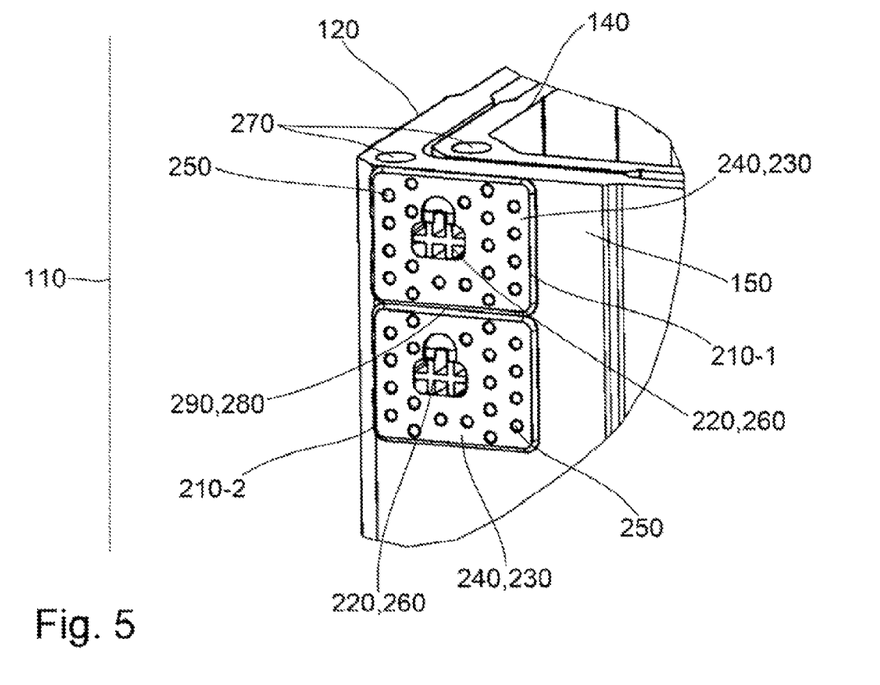
FIG. 5 is a perspective view of another part of the first lifting column component that includes two guide components in contact with each other.

FIG. 5 shows an illustration comparable to FIG. 4 of the first lifting column component 120 and the third lifting column component 140. As has already been explained in the context of FIGS. 1 and 2, the first lifting column 120 has a first and a second opening 160, 170 (not visible in FIG. 5) in the guide section 150, which first and second openings 160, 170 are formed and disposed such that the attachment structures 220 of first and second guide components 210-1, 210-2 can be inserted into the two openings 160, 170. The openings 160, 170 and the two guide components 210 are formed such that the two guide components 210 are in contact with each other when inserted in the two openings 160, 170.

The two guide components 210-1, 210-2 shown in FIG. 5 are identical to each other and/or identical to the guide component 210 shown in FIG. 3. The guide components 210 are offset along the direction of movement 110. They are oriented according to the arrangement described in the context of FIGS. 1 and 2 of the first and second openings 160, 170.

The guide sections 230 of the two guide components 210 have a substantially rectangular shape with rounded corners, which shape substantially corresponds to that of the guide surface 240. The rectangular surface is only interrupted by the lubricant pockets 250, and the connecting structure 260 or the attachment structure 220.

In the embodiment shown here the two guide components 210-1 and 210-2 are in contact with each other along a common contact edge 280. In other words, the guide components 210-1 and 210-2 are arranged so that they are in contact along a line 290 which is coincident with the contact edge 280.

The lifting column 100 according to an exemplary embodiment thus has two guide components 210-1, 210-2 disposed so that a contact edge 280 of the first guide component 210-1 is parallel to a contact edge 280 of the second guide component 210-2 so that a surface pressure can be reduced. In addition, due to the common contact edge 280 or contact line 290 this parallel connection of the two mushroom pegs can transmit a torque introduced (originating) in one of the guide components, e.g., component 210-1, to the other guide component, e.g., component 210-2. Torques can arise due to frictional forces occurring on the guide surfaces 240. Due to the transfer of the torque between the guide components 210, that is the distribution of torque to two guide components, the two components will be able to withstand a greater amount of torque than a single component without being destroyed. In other words, because of their close placement, the two guide components 210 cooperate with one another to absorb torque.

Using the parallel connection along contact edges 280, shown for example in FIG. 5, of the corresponding mushroom pegs, their destruction can be prevented since with the parallel arrangement of the guide components 210 no torque or only a limited torque is introduced on the attachment structures 220 (attachment pins). The two guide components 210 thus support each other.

Such an implementation can be useful if the guide components 210 or their guide sections 230 cannot form an interference-fit contact to the first lifting column component 120 or another lifting column component in a direction parallel to the guide surface. This lack of an interference fit can be even more problematic if the guide components 210 are particularly sensitive to corresponding torques due to their geometric design and arrangement. Thus for example in the eccentric arrangement also clearly visible in FIG. 5 a torque can be introduced more easily in the respective attachment structures 220. This can be further promoted by the fact that the guide sections 230 or the guide surfaces 240 of the guide components 210 do not extend completely along a width of the respective guide surface 150 of the respective lifting column component 120 along a circumferential or peripheral direction perpendicular to the direction of movement 110. Here the circumferential direction extends substantially parallel to the guide surface 150.

Such an exemplary embodiment can thus be useful, since in a lifting column the outer lifting column components have a larger cross-section area than the inner lifting column components. Therefore, when using identical guide components 210 on surfaces having different widths, the guide components will not fully extend over the width of the guide surfaces 150 and will extend over different percentages of each of the different guide surfaces.

Of course, in other lifting columns 100 according to an exemplary embodiment differently formed guide components 210 can also be used. Thus for example the lubricant pockets 250 as well as the specific design of the attachment structure 220, the design of the corresponding openings 160, 170, 190, and many further aspects which have been described in the context of FIGS. 1 to 5 are optional designs that can be embodied differently. Thus for example the lifting column components 120, 130, 140 can also optionally have round or circular cross-sections so that the corresponding guide surfaces 150, 200 are cylindrical (hollow cylindrical). Of course, attachment technologies or techniques other than the plug-in or push-in connections described in the context of FIGS. 1 to 5 can also be used for attaching the guide components 210 in the corresponding openings 160, 170, 190.

By using the two guide components 210-1, 210-2 which are in contact with each other along a line segment, a linear guiding of at least two lifting column components 120, 130 which are insertable one-into-the-other can be made possible with a simple construction that also makes possible an improved absorption of torques-torques that occur, for example, due to mechanical deformations, frictional forces, and other effects on the corresponding guide components 210.

The features disclosed in the foregoing description, in the claims, and in the drawings can be relevant individually, as well as in any combination, to the realization of the invention in its various embodiments.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

100 Lifting column
110 Direction of movement
120 First lifting column component
130 Second lifting column component
140 Third lifting column component
150 Guide surface
160 First opening
170 Second opening
180 Bore
190 Further opening
200 Further guide surface
210 Guide component
220 Attachment structure
230 Guide section
240 Sliding surface
250 Lubricant pocket
260 Connecting structure
270 Bore
280 Contact edge
290 Line

I claim:

1. A lifting column comprising:
a first lifting column component and a second lifting column component insertable into the first lifting column component along a direction of movement, wherein the first and second lifting column components have, respectively, an inner guide surface and an outer guide surface extending along the direction of movement, which guide surfaces face each other in a retracted state of the lifting column, and wherein the first lifting column component has first and second openings in the inner guide surface thereof; and
a first guide component and a second guide component disposed adjacent the first guide component along the direction of movement, each having an attachment structure extending out of a substantially planar guide section, the guide sections comprising at least one side edge, wherein the first and second guide components are configured such that their attachment structures are insertable into the first and second openings of the first lifting column component so that the guide sections abut an outer surface of the first lifting column component and extend to the inner guide surface of the second lifting column component, and
wherein the first and second guide components and the first and second openings are configured and arranged such that the side edges of the first and second guide components are in contact with each other and the first and second guide components cannot rotate in the first and second openings of the first lifting column component when the attachment structures are mounted in the openings.

2. The lifting column according to claim 1, wherein the guide sections of the first and second guide components contact each other along a line segment.

3. The lifting column according to claim 1, wherein the first and the second lifting column components are configured such that the guide sections of the first and second guide components have no interference-fit contact to the first and/or the second lifting column component in a direction parallel to the inner and outer guide surfaces.

4. The lifting column according to claim 1, wherein the inner and outer guide surfaces of the first and second lifting column components are planar and the guide sections are substantially plate-shaped.

5. The lifting column according to claim 4, wherein the guide sections of the first and second guide components extend at most 80% along a width of the inner guide surface of the first lifting column component in a direction perpendicular to the direction of movement.

6. The lifting column according to claim 4, wherein the attachment structures are offset with respect to a geometric center point of their respective guide section.

7. The lifting column according to claim 1, wherein the first and second guide components are manufactured from a polymer.

8. The lifting column according to claim 1, wherein the first and second guide components are manufactured from an injection-moldable polymer.

9. The lifting column according to claim 1, wherein the first and second guide components comprise one-piece components.

10. The lifting column according to claim 1, wherein the first and the second guide components are identical.

11. The lifting column according to claim 1,
wherein the first and second guide components contact each other along a line, and wherein the first and the second guide components are identical.

12. The lifting column according to claim 1, wherein the first and second openings in the first lifting column component are non-circular.

13. The lifting column according to claim 12, wherein the at least one side edge of the first guide component and the at least one side edge of the second guide component are linear and contact one another along a line segment.

14. The lifting column according to claim 13, wherein the line segment is perpendicular to the direction of movement.

15. The lifting column according to claim 14, wherein a rear wall of the first guide component is parallel to the at least one guide surface of the first lifting column component and does not form an interference fit with the at least one inner guide surface of the first lifting column component.

16. The lifting column according to claim 15, wherein a front wall of the first guide component opposite the rear wall includes a plurality of recesses filled with lubricant.

\* \* \* \* \*